(12) United States Patent
Weh et al.

(10) Patent No.: US 6,530,605 B1
(45) Date of Patent: Mar. 11, 2003

(54) QUICK-ACTION COUPLING, ESPECIALLY FOR PLAIN END PIPES

(76) Inventors: Erwin Weh, Siemensstrasse 5, 89257 Illertissen (DE); Wolfgang Weh, Siemensstrasse 5, 89257 Illertissen (DE)

( * ) Notice: Subject to any disclaimer, the term of this patent is extended or adjusted under 35 U.S.C. 154(b) by 0 days.

(21) Appl. No.: 09/485,076
(22) PCT Filed: Aug. 3, 1998
(86) PCT No.: PCT/EP98/04829

§ 371 (c)(1),
(2), (4) Date: Apr. 24, 2000

(87) PCT Pub. No.: WO99/06752

PCT Pub. Date: Feb. 11, 1999

(30) Foreign Application Priority Data

Aug. 2, 1997 (DE) ..................... 297 13 794 U

(51) Int. Cl.[7] ................................. F16L 37/00
(52) U.S. Cl. ................. 285/308; 285/311; 285/316
(58) Field of Search ................... 285/102, 308, 285/310, 311, 314, 315, 316; 37/614.05, 614.06

(56) References Cited

U.S. PATENT DOCUMENTS

| 4,716,938 A | * | 1/1988 | Weh et al. ..................... 138/93 |
| 5,095,947 A | * | 3/1992 | Weh et al. ............. 137/614.06 |
| 5,575,510 A | * | 11/1996 | Weh et al. ................... 285/316 |
| 5,950,679 A | * | 9/1999 | Danielson ..................... 138/89 |
| 6,035,894 A | * | 3/2000 | Weh et al. ............. 137/614.06 |
| 6,062,606 A | * | 5/2000 | Carpini et al. ............... 285/316 |
| 6,073,974 A | * | 6/2000 | Meisinger et al. .......... 285/316 |
| 6,099,044 A | * | 8/2000 | Weh et al. ..................... 285/33 |

FOREIGN PATENT DOCUMENTS

FR 0985539 * 7/1951 ................. 285/102

* cited by examiner

Primary Examiner—Lynne H. Browne
Assistant Examiner—Aaron Dunwoody
(74) Attorney, Agent, or Firm—Knobbe, Martens, Olson & Bear, LLP

(57) ABSTRACT

A quick connector for pipes for pressure or vacuum testing includes a tubular housing extending in an axial direction, a spreadable connecting element mounted within the tubular housing, formed as a sleeve and configured to clamp a pipe in a connected position, and an actuating device configured to act upon the connecting element to release the connecting element. The actuating device includes a hand lever extending in the axial direction of the housing. The hand lever has an actuating push rod that extends through an outer wall of the housing. The quick connector includes further a piston positioned within the housing and configured to be movable in the axial direction by the actuating device, and a compression spring positioned within the housing and configured to bias the piston in a connected position.

13 Claims, 2 Drawing Sheets

QUICK-ACTION COUPLING, ESPECIALLY FOR PLAIN END PIPES

BACKGROUND OF THE INVENTION

1. Field of the Invention

This invention relates to a quick connector, especially for smooth pipes for hydraulic or pneumatic pressure or vacuum testing.

2. Description of the Related Technology

Such quick connectors are used for pressure testing heat exchanger pipes in heating plants or cooling plants for example. The quick connector is fitted on the open end of a pipe, on the outside or the inside, while generally speaking a connecting element, especially in plug form, can be splayed in the radial direction so that the quick connector engages the inner or outer wall of the pipe forcefully through friction. The connecting element can also be formed as a slotted sleeve engaging round the outside. This connecting element is then splayed in or splayed out slightly in the radial direction by an actuating device, so that frictional engagement is produced between the pipe wall and housing of the quick connector.

Such a quick connector should offer an especially simple facility for coupling up, since in mass production a plurality of such smooth pipes have to be tested. In addition the retaining force should be especially high, so that the testing can be carried out safely even with high pressures in the region of about 50 bar or more.

SUMMARY OF CERTAIN INVENTIVE ASPECTS

Accordingly the invention is based on the object of further improving a quick connector in respect of handling and retaining force.

A quick connector for pipes for pressure or vacuum testing includes a tubular housing extending in an axial direction, a spreadable connecting element mounted within the tubular housing, formed as a sleeve and configured to clamp a pipe in a connected position, and an actuating device configured to act upon the connecting element to release the connecting element. The actuating device includes a hand lever extending in the axial direction of the housing. The hand lever has an actuating push rod that extends through an outer wall of the housing. The quick connector includes further a piston positioned within the housing and configured to be movable in the axial direction by the actuating device, and a compression spring positioned within the housing and configured to bias the piston in a connected position.

A particularly simple construction of the quick connector arises from the proposed design of the quick connector, wherein a piston is guided in the housing and can be shifted axially by the actuating device. In addition the retaining force of the quick connector is increased by biasing the piston into the connected position by a compression spring, since very strong compression springs can be fitted, which then bias the connecting element with a correspondingly high splaying force.

In the preferred implementation a splaying piston is interposed between the piston and the connecting element in the housing of the quick connector and acts on the connecting element with a high splaying force by means of an annular wedge surface, (the connecting element being formed as an internal or external connection and being quickly interchanged through a sleeve for the current pipe diameter). In addition, this interposed splaying piston has the particular advantage that an annular piston surface of larger diameter can be provided on the end surface facing away from the pipe. An additional force of application on the connecting element is created by this, so that the splaying piston is forced in the direction of the connecting element as the fluid pressure (test pressure) rises and the retaining force of the frictional engagement is increased proportionally with the test pressure.

Furthermore the actuating device is preferably in the form of a hand lever, which is mounted at the forward end of the quick connector. A large lever length for counteracting the compression spring can be provided in this way. The hand lever preferably comprises an actuating push rod which is passed through the outer wall of the housing to the piston at an angle of about 45E. A good application of force can be achieved by this when uncoupling the quick connector. The end surface of the piston on the pipe side preferably serves at the same time as a stop surface for the inserted smooth pipe.

Two embodiments of the quick connector will be explained in more detail and describe with reference to the drawings, in which:

DETAILED DESCRIPTION OF CERTAIN INVENTIVE EMBODIMENTS

Figure 1:
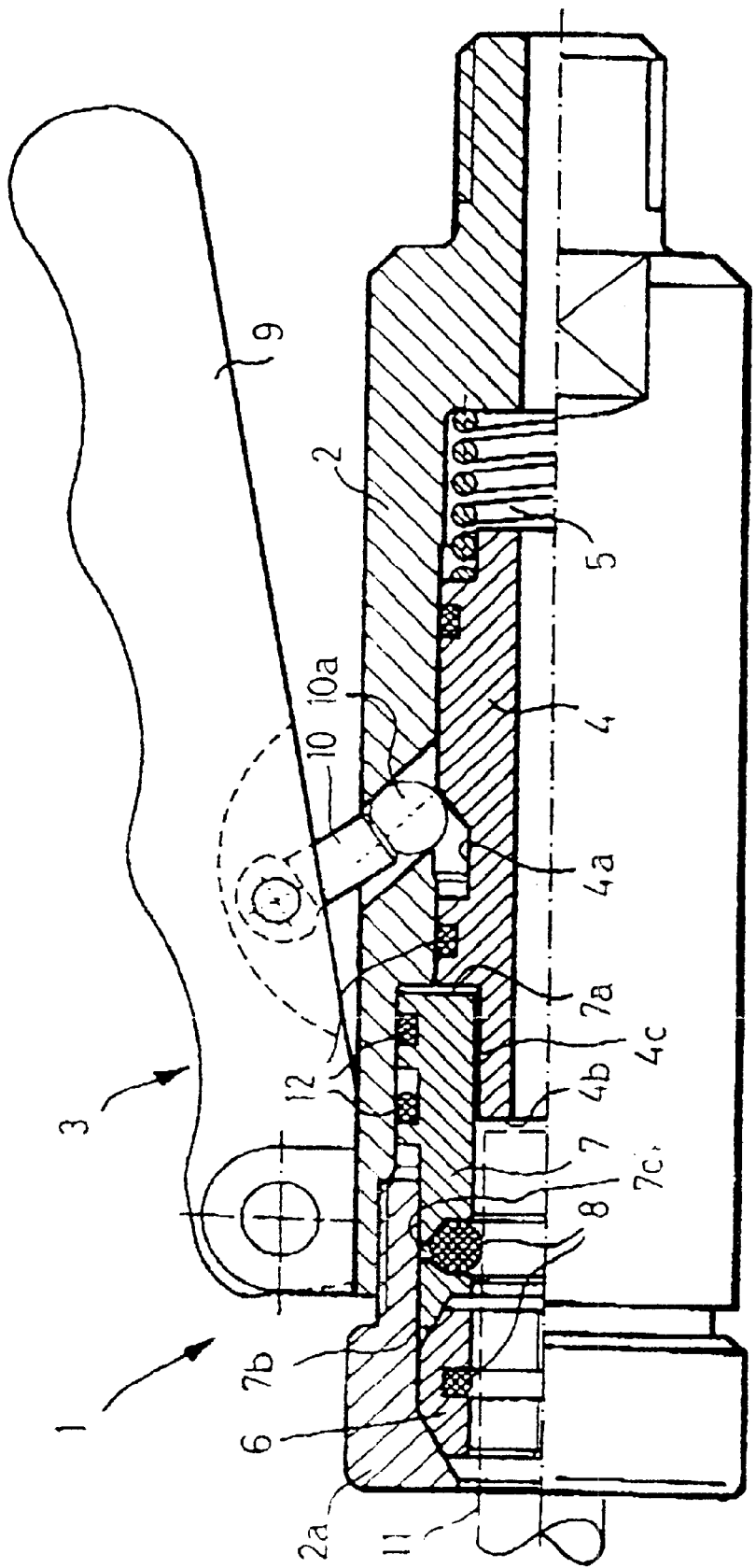
FIG. 1 shows a quick connector for external coupling to a smooth pipe on the outside in a half section view and FIG. 2 shows a modified embodiment of the quick connector according to FIG. 1.

A quick connector 1 is shown in half section in FIG. 1, comprising as components thereof a tubular housing 2 and an actuating device 3. The housing 2 is provided on here the right side with a threaded connector, to which the test medium can be coupled by means of a hose. On the side shown here on the left a smooth pipe 11 can be inserted, as shown in broken lines, or the quick connector 1 can be fitted on to this smooth pipe 11. A screw sleeve 2a is provided on the side here on the left, as a component of the housing 2, in which is mounted a connecting element 6. This design of a sleeve 2a which can preferably be screwed into or on to the housing 2 serves to enable rapid exchange and fitting of the connecting element 6 to adapt to the current pipe diameter of the smooth pipe 11.

Inside the housing 2 there is mounted an axially movable piston 4, guided on the inner wall surface of the housing 2. The piston is biased by a relatively strong compression spring 5 into the connected position, i.e. towards the smooth pipe 11. The connecting element is splayed inwardly by an annular wedge surface 7a (and preferably also by a asymmetrically formed internal conical surface in the sleeve 2a). This annular wedge surface 7b can also be formed on the forward end of the piston 4. Furthermore the end surface of the piston is also formed as a stop surface 4b for the inserted smooth pipe 11.

However, in a preferred embodiment a two-part construction is chosen, namely such that a splaying piston 7 is fitted on the front end of the piston 4. This makes it possible to use different materials, in particular hardened steel for the frictionally stressed annular wedge surface 7b while a less wear-resistant material is used for the piston 4.

It is important that there is an annular piston surface 7a on the splaying piston 7 which is accessible to the test medium (fluid) through an annular gap 4c between the splaying piston 7 and the piston 4. The splaying piston 7 is biased forward on to the connecting element 6 by this, in proportion to the applied pressure, so that a higher force of application is exerted on the connecting element 6 with a higher test pressure, so that its retaining force on the smooth pipe 11 likewise rises approximately proportionally. It should be noted that, instead of the illustrated outer clamping of the smooth pipe 11, a corresponding internal connection can be implemented, wherein a spreading connecting element which can be splayed out engages as a plug on the pipe wall from the inside. In this case the annular wedge surface 7b would be arranged in mirror image relative to the central axis, in order to spread the connecting plug 6 from inside into the connected position.

In the connected position the sleeve formed connecting element 6 shown here is splayed together in the external design shown here, while a sealing ring 8 fitted therein comes into engagement with the smooth pipe 11. A similar sealing ring 8 is also provided on the splaying piston 7 in a region of engagement 7c, in order to increase the sealing effect. It should be noted that the connecting element 6 here of annular form also has a has a conical surface opposite the screw sleeve 2a, so that the effect of radial splaying together takes place symmetrically.

The actuating device 3 is here mounted on the outer periphery of the housing 2 and is formed by a hand lever 9. The hand lever 9 is mounted as far towards the front end of the housing 2 as possible (the left end here), so that is lever length can be a large as possible, so that easy actuation is facilitated with a suitably high spring force of the compression spring 5.

An actuating push rod 10 is fitted inside the hand lever 9 and is passed through the outer wall of the housing 2. The inner end of the actuating push rod 10, which preferably is given a ball profile 10a, engages in a peripheral groove 4a of the piston 4 and thus forces the piston 4 to the right, against the compression spring 5, when the hand lever 9 is pulled towards the housing 2.

It should be noted that, on account of this construction, the piston 4 can move axially independently, so that the splaying piston 7 remains in the retaining position through the annular piston surface 7a. Only when the pressure in the housing 2 has collapsed can be splaying piston 7 move here to the right, in order thus to release the splayed position of the connecting element 6 on to the smooth pipe 11. Particularly high safety of the quick connector 1 is achieved through this.

It should be noted that the piston 4 and also the splaying piston 7 are sealed on the outside with seals 12. In the modified embodiment according to FIG. 2 the screw sleeve 2a is made longer and has a further sealing ring 12, in order to seal the pressure chamber on the annular piston face 7a particularly reliably. The other components are identical with the embodiment according to FIG. 1 and are thus given the same reference numerals.

Figure 2:
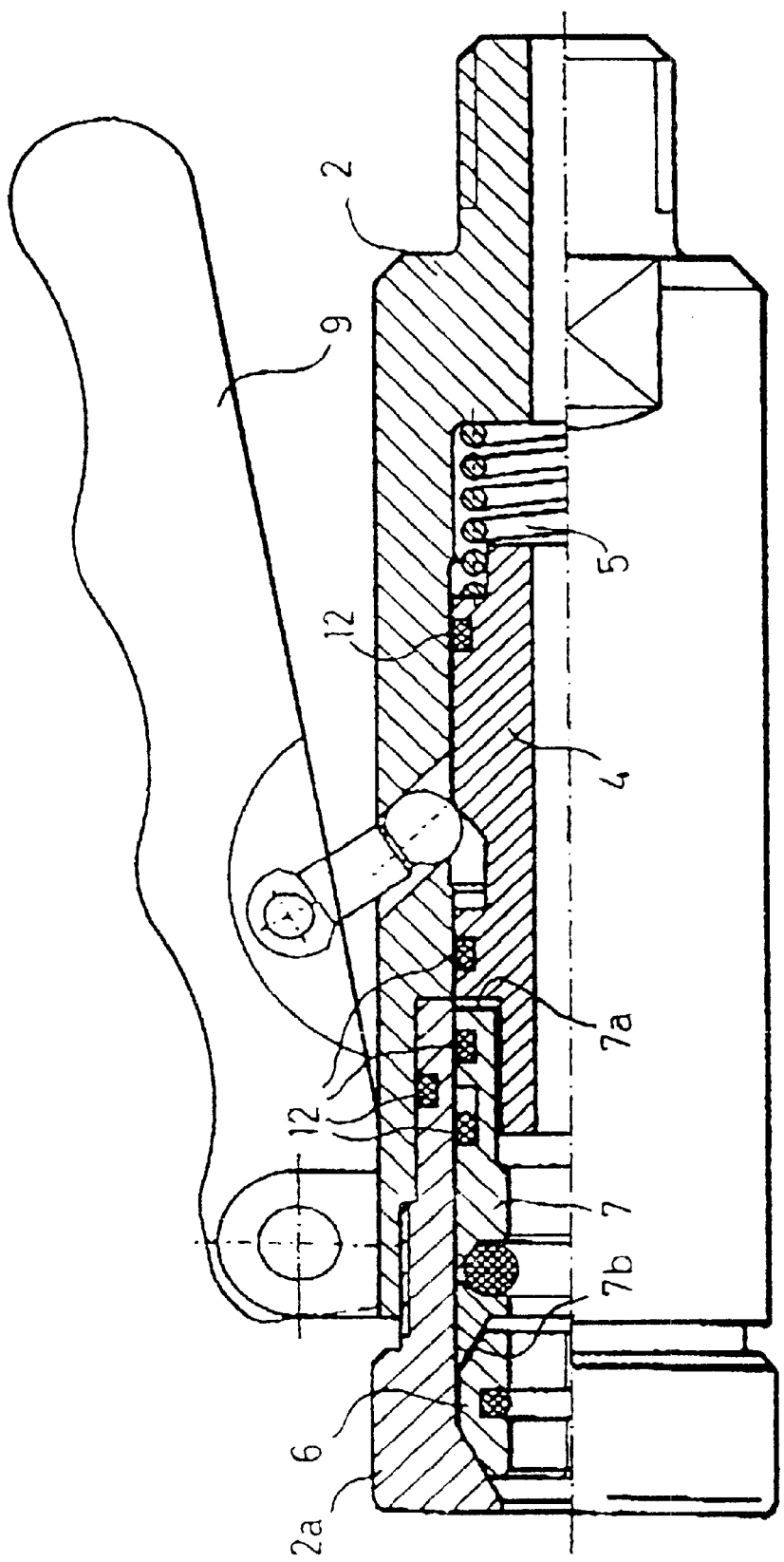

However, the embodiment according to FIG. 2 has a somewhat smaller annular piston surface 7b as a further difference from the embodiment according to FIG. 1, so that the splaying together force for the connecting element 6 is here smaller in comparison with the embodiment in FIG. 1. However a greater guide length of the splaying piston 7 results here in a particularly compact construction of the quick connector 1.

All in all there thus results a quick connector 1 which is especially simple to operate, with a simple, compact construction and especially high retaining force on the counterpart in the form of a smooth pipe. It should be noted that rimmed ends of pipes or lines should be understood within the concept of smooth pipe, for example the usual construction in brake lines or in hydraulic lines which can also be tested for their tightness particularly simply by means of the quick connector 1.

What is claimed is:

1. A quick connector for pipes for pressure or vacuum testing, comprising:

a tubular housing extending in an axial direction;

a spreadable connecting element mounted within the tubular housing and formed as a sleeve, the connecting element configured to clamp a pipe in a connected position;

an actuating device configured to act upon the connecting element to release the connecting element, wherein the actuating device includes a hand lever extending in the axial direction of the housing, and wherein the hand lever has an actuating push rod that extends through an outer wall of the housing;

a piston positioned within the housing and configured to be movable in the axial direction by the actuating device, wherein the actuating push rod is disposed at an angle of about 45° with respect to the piston; and a compression spring positioned within the housing and configured to bias the piston in a connected position.

2. The quick connector of claim 1, wherein the connecting element has a plurality of slots extending in the axial direction, and wherein the piston is in direct engagement with the connecting element.

3. The quick connector of claim 1, wherein the connecting element has a plurality of slots extending in the axial direction, and wherein the piston acts on an intermediate piston, which is in engagement with the connecting element.

4. The quick connector of claim 3, wherein the intermediate piston is guided in a sealed manner in the housing.

5. The quick connector of claim 3, wherein the intermediate piston is guided in a sealed manner on the piston.

6. The quick connector of claim 3, wherein the intermediate piston has an annular piston surface on a front end that faces away from the connecting element, and wherein the annular piston surface has a diameter that is greater than a diameter of the connecting element.

7. The quick connector of claim 1, wherein the connecting element is mounted in a screw sleeve and configured to be spread by an annular wedge surface.

8. The quick connector of claim 3, further comprising a sealing ring arranged on at least one of the connecting element and the intermediate piston.

9. The quick connector of claim 1, wherein the hand lever is mounted on an end of the housing that faces toward the pipe.

10. The quick connector of claim 1, wherein the actuating push rod has a rounded profile at an inner end, which is in engagement with a peripheral groove of the piston.

11. The quick connector of claim 1, wherein an end face of the piston is formed as a stop surface for the pipe.

12. A quick connector for pipes for pressure or vacuum testing, comprising:

a tubular housing extending in an axial direction;

a spreadable connecting element mounted within the tubular housing and formed as a sleeve, the connecting element configured to clamp a pipe in a connected position, wherein the connecting element has a plurality of slots extending in the axial direction;

an actuating device configured to act upon the connecting element to release the connecting element, wherein the actuating device includes a hand lever extending in the axial direction of the housing, and wherein the hand lever has an actuating push rod that extends through an outer wall of the housing;

a piston positioned within the housing and configured to be movable in the axial direction by the actuating device, wherein the piston acts on an intermediate piston, which is in engagement with the connecting element, wherein the intermediate piston has an annular piston surface on a front end that faces away from the connecting element, and wherein the annular piston surface has a diameter that is greater than a diameter of the connecting element; and a compression spring positioned within the housing and configured to bias the piston in a connected position.

13. A quick connector for pipes for pressure or vacuum testing, comprising:

a tubular housing extending in an axial direction;

a spreadable connecting element mounted within the tubular housing and formed as a sleeve, the connecting element configured to clamp a pipe in a connected position;

an actuating device configured to act upon the connecting element to release the connecting element, wherein the actuating device includes a hand lever extending in the axial direction of the housing, and wherein the hand lever has an actuating push rod that extends through an outer wall of the housing;

a piston positioned within the housing and configured to be movable in the axial direction by the actuating device, wherein the actuating push rod has a rounded profile at an inner end, which is in engagement with a peripheral groove of the piston; and a compression spring positioned within the housing and configured to bias the piston in a connected position.

* * * * *